J. Melling.
Brick Mach.
Patented Oct. 22, 1861.

N°. 33,535.

Witnesses.

Inventor
John Melling

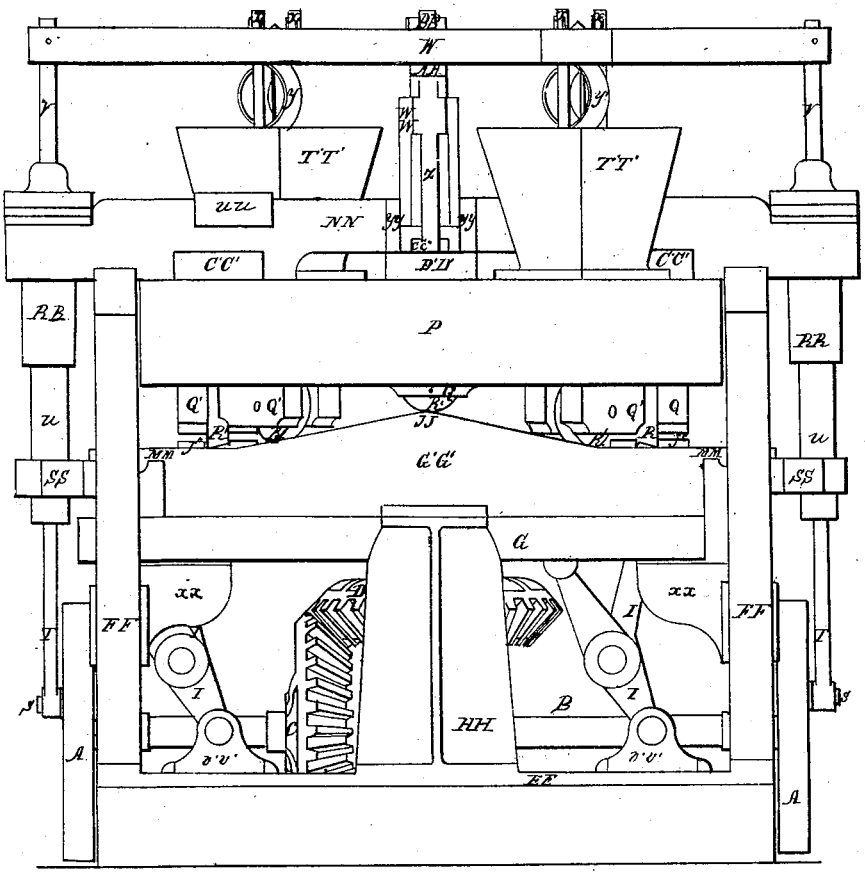

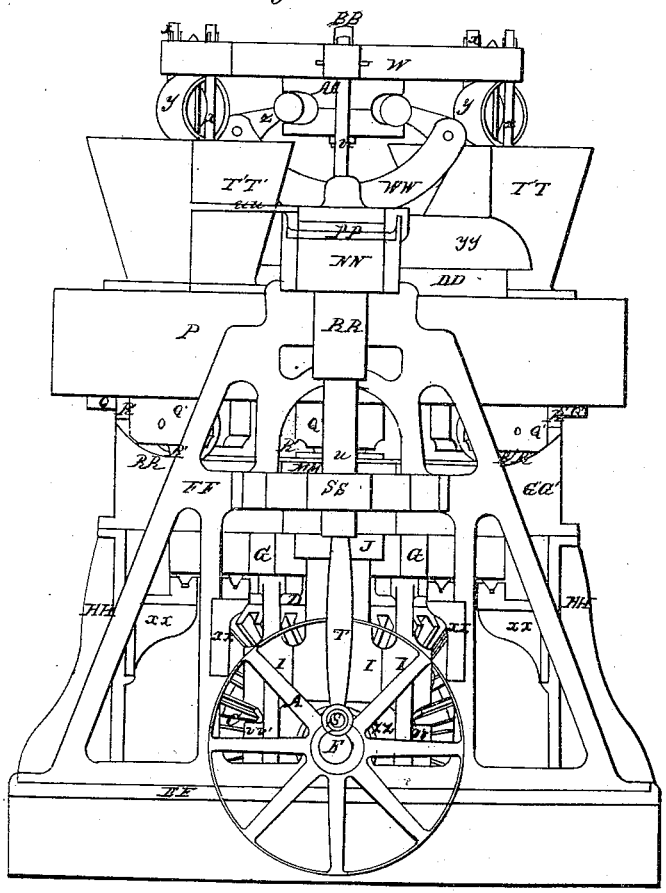

J. Melling.
Brick Mach.
No. 33,535.
Patented Oct. 22, 1861.
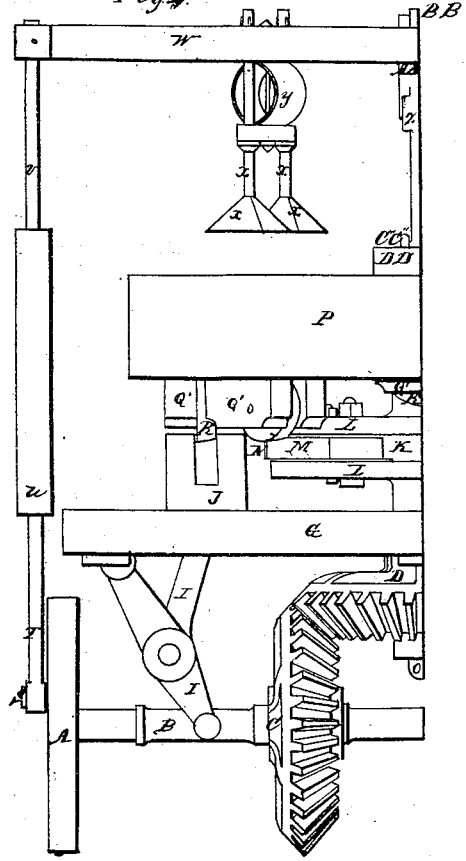
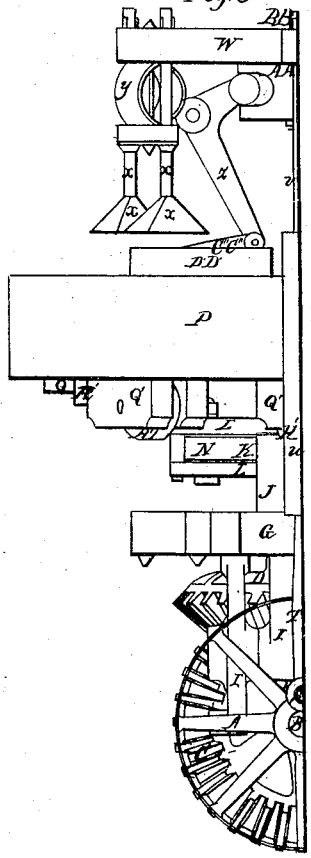
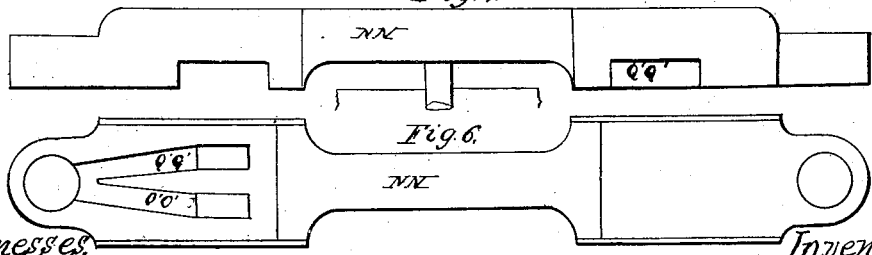
Witnesses.
Inventor.
John Melling

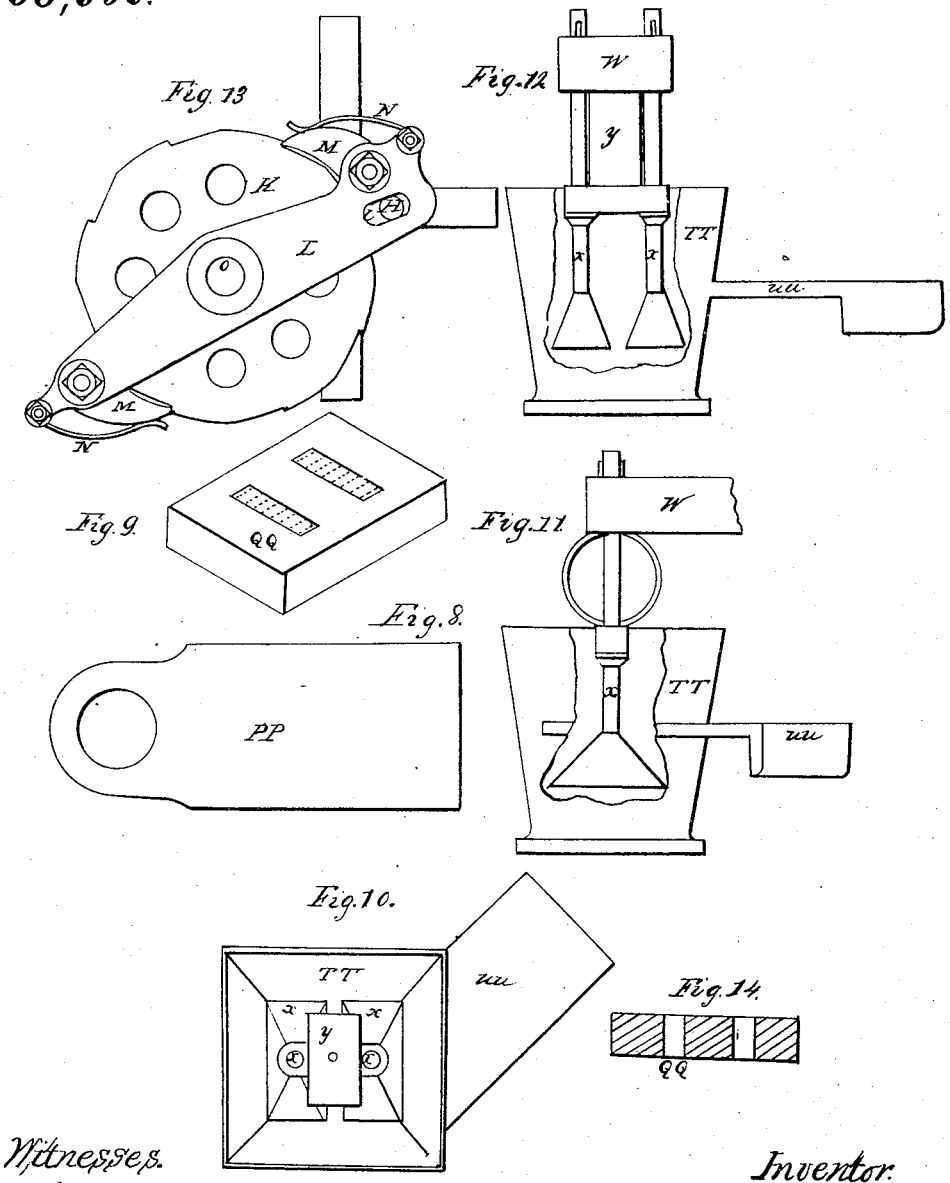

UNITED STATES PATENT OFFICE.

JOHN MELLING, OF BOLTON, ENGLAND.

IMPROVEMENT IN MACHINES FOR MAKING BRICKS.

Specification forming part of Letters Patent No. 33,535, dated October 22, 1861.

*To all whom it may concern:*

Be it known that I, JOHN MELLING, of the town of Bolton, in the county of Lancaster and Kingdom of Great Britain, have invented a new and Improved Mode of Molding and Pressing Bricks, Tiles, and other Building Materials; and I do hereby declare that the following description, taken in connection with the accompanying drawings hereinafter referred to, forms a full and exact specification of the same, wherein I have set forth the nature and principles of my said improvements by which my improvements may be distinguished from all others of a similar class, together with such parts as I claim and desire to have secured to me by Letters Patent.

The figures of the accompanying plate of drawings represent my improvements.

Figure 1:
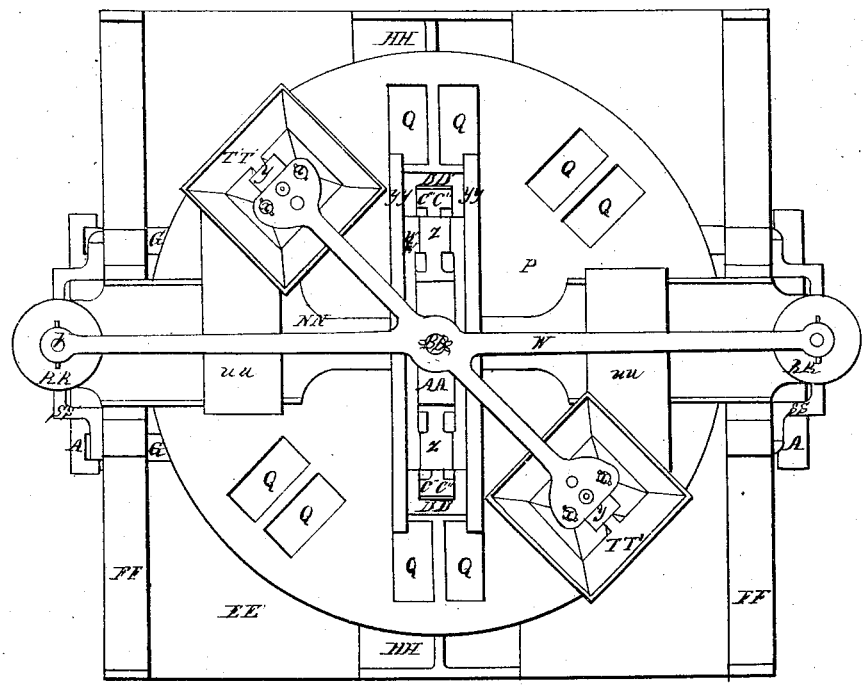
Figures 14, 15:
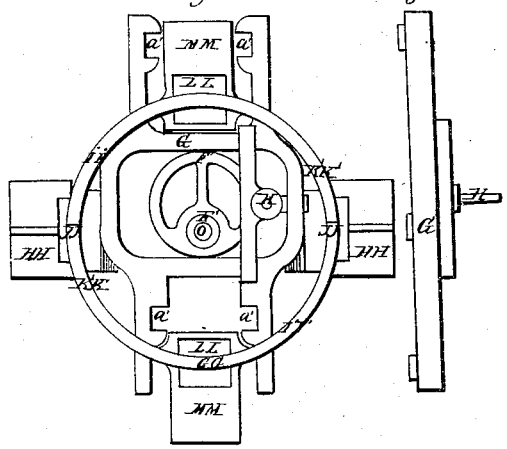

Figure 1 is a plan or top view. Fig. 2 is a front elevation. Fig. 3 is an end elevation. Figs. 4, 5, 6, 7, 8, 9, 10, 11, 12, 13, 14, 15, and 16 are detail views of different portions of the machine, which will be hereinafter referred to by letters more particularly.

In the manufacture of bricks, slabs, tiles, &c., by machinery one of the principal difficulties heretofore encountered has been the presence of air and gases in the material when pressed, the expansion of which, when subjected to heat in the kiln, has caused fissures and cracks to occur in the articles made, usually injuring their quality and often destroying them entirely; secondly, it has been found extremely difficult to produce bricks and tiles of equal specific gravity and density, whereby some of them would absorb more moisture than others, the disadvantages of which is manifest; thirdly, the formation of bricks and tiles with true, even, and clean edges and lines has rarely been accomplished, owing to the fact that the plungers used to press the material into the molds or dies in their upward movement necessarily lifted entirely clear of the same, and consequently could not be made so as to fit closely therein in their downward motion, because if they were so made the wear and tear of the machinery would soon displace them from their true line of motion and prevent their entering the molds or dies. There are many other obstacles that have been encountered in the making of bricks, &c., by machinery which need not be herein particularly alluded to.

The object of my improvements is, first, to produce a machine which shall perform the entire work of forming bricks, tiles, &c., and removing them when so formed from the machine automatically and with rapidity; secondly, to remove the air and gases from the materials, while they are being pressed, by means of air-pumps or otherwise, and thus prevent the articles formed from cracking during the time they are subjected to heat; thirdly, to produce bricks, slabs, &c., of uniform specific gravity and density, which result and effect are obtained by subjecting the materials used to pressure in the hoppers previous to the ultimate pressing operation by a peculiar arrangement of devices, which will be hereinafter fully described; fourthly, to insure the formation of true and even edges to the bricks or other articles formed. I effect this object by so arranging and actuating the rams by which pressure is imparted to the material to be operated upon as to cause them both during their upward and downward movement to remain within and be guided by the molds or dies, so that they will always fit and play closely and accurately therein, and thus prevent any of the material being pressed from getting between the edges of the rams and their molds or dies.

There are many other improvements incidental to the working of my machine which will be fully explained in the sequal.

E E in the drawings represent the foundation-plate of the machine, having two upright supporting standards F F.

B is a horizontal shaft extending across the foundation-plate and having bearings at each end in standards of the same.

A A are two driving wheels or pulleys, one at each end of the shaft B.

T T are two connecting-rods, each attached at one end by a crank-pin to one of the two driving-pulleys A, and at the opposite end by a pivot to the lower end of each piston U of two suitable vertical exhausting air apparatus R R, used for purposes to be hereinafter described. To the upper end of each of the said pistons U a rod V is secured, which, extending upward, is fastened to each end of a cross-head W above a traveling mold block or plate P of the machine. This traveling mold-block P is provided with any desired number of molds for the reception of the material used for the formation of bricks, tiles, &c., and in order that it—the mold-plate—may have its molds successively brought in apposition with a set of devices that are employed for the filling of the same, exhausting the air from the material, and for the pushing off of the bricks, &c., from the machine as fast as formed, all of which will be herein described in their order of execution, an intermittent rotary motion is so imparted to the said plate by an arrangement of devices to be next described as to allow the plate to remain stationary during the operation of the devices used for the various results to be accomplished, the movements being simultaneous, but upon different molds of the mold-block.

Upon the shaft B of the machine is a bevel gear-wheel C, which engages with another and similar bevel gear-wheel D on the lower end of a hollow vertical shaft or bushing E', upon the upper end of which is an eccentric F'. The hollow shaft E' turns loosely upon the shaft O of the mold-block P, having a bearing at its lower end in the foundation-plate E E, and at its upper end in the resisting girder N N, to be hereinafter referred to, extending across the frame-work. Upon this vertical shaft O is a ratchet-wheel K, having teeth corresponding with the number of sections into which the mold-block P is divided. With the ratchet-wheel K two spring-pawls M, diametrically opposite to each other, engage, and which are placed between the surfaces of two arms or levers L, turning loosely upon the shaft E' and extending across the ratchet-wheel K. In the arm L is a groove or slot $l$, within which bears a stud or pin H of a traveling frame G. The eccentric F of the shaft E', having motion transmitted to it from the driving-wheel by the arrangement of gears described, bears upon the inside surface of the traveling frame G and so operates the same as to cause it to travel back and forth in a horizontal direction. Such a motion being imparted to the traveling frame G, it, (the stud H,) by bearing in the slot of the arm or lever L, turns the said arms in a forward and backward direction upon the shaft E', and as the pawls M are attached to the same they, when engaged with the teeth, during the time the traveling frame G moves forward turn the ratchet-wheel K, and thereby the mold-block a sufficient distance to bring the molds Q of the same successively in the proper positions desired. The pawls M when the frame G is traveling back pass freely over the teeth of the ratchet-wheel K to the position they first occupied to engage with the same, the interval of time occupied by the frame G in its backward movement being that during which the mold-block is necessarily stationary. The mold block or plate P, having thus an intermittent rotary motion imparted to it by the operation of the devices above described, I will next describe the means employed for filling its molds Q, which is the first operation to be performed.

T' T' are hoppers, in which is placed the material to be pressed into the molds Q of the mold-block.

$x$ $x$ are plungers or rams attached by short vertical shafts to the cross-head W of the machine. For the purpose of pressing the material into the molds by the plungers or rams $x$ $x$ a motion in a vertical plane is imparted to them by the downward and upward movement of the cross-head W caused by the operation of the connecting-rods T T, hereinbefore referred to. A vertical motion being thus imparted to the plungers or rams $x$ $x$, the material is forced into the molds Q, the sides of the molds serving as guides to the rams $x$ $x$, which molds after being filled are passed by the rotary motion of the mold-block P to the compressing devices, the air and gases being at the same time exhausted from the material in the molds Q, as will presently be described.

Y is a spring attached to the plungers or rams $x$, in order to relieve them of too great a strain when operating to fill the molds and so that they will exert an elastic yielding pressure upon the material in the hoppers.

In each end of the traveling frame G are notches $a'$ $a'$, within which are placed the upper ends of a vertical lever-frame I turning at the lower end upon short horizontal shafts bearing in standards $v'$ $v'$ of the foundation-plate E E. I' is a lever swinging in bearings or sockets of the lever-frame I at an intermediate point between its two ends, the two levers I and I' combined forming what is generally termed a "knee-lever." To the lever or arm I' of the knee-lever is attached by a pivot, a block J, with two prongs or rams. This double-pronged block J passes upward through sockets of a camway G' G', permanently secured to the standards of the framework. Traveling and bearing upon this camway G' are guide-wheels R' R', which have bearings in a two-pronged block C' C', the prongs passing upward into the molds Q of the mold-block P. The upper ends of the said prongs form the bottom of the molds Q, &c., to be filled by the plungers or rams and thereby limit the depth of the same.

By the forward motion of the traveling frame in a horizontal direction the knee-levers I I' are so operated as to raise the prongs of the blocks J, which, abutting against the block C' C', &c., of the guide-wheels R', also raises them. The two pronged blocks C' and guiding-wheels R' being thus raised, an upward pressure is brought to bear upon the material in the molds against a perforated block Q' of the resisting girder N, before referred to. At the same time that the material is being thus pressed against the perforated block Q' the air and gases are forced out through the perforations of the said blocks Q' into the air-passages O' O', leading to the exhausting air-pumps R R to the pistons U, to which a vertical motion is imparted at the same time with that of the plungers of the hoppers. The air and gas having been entirely exhausted by the air-pumps from the material in the molds, the upward pressure upon the material is relieved by the backward action of the traveling frame upon the knee-levers I I', tending to withdraw or lower the two pronged blocks C' C' of the guide-wheels R'. The guide-wheels R' R', turning upon bearings in the two pronged blocks C' of the molds, travel or bear upon the upper surface of the camway G' as the mold block or plate P is revolved.

In order that the bricks or tiles formed in the molds Q' may be raised to the surface of the mold-plate P, the said camway G' is so arranged with ascending and descending planes I'' I'' K' K' that after the material has been pressed and exhausted of air and gas the wheels R', in traveling over the ascending planes I'' I'', will raise the bricks or tiles to the top surface of the mold-plate, in readiness to be removed from the machine by the operation of devices which I will next proceed to describe, it constituting the final operation performed by my improved machine upon the bricks or tiles. To the cross-head W is attached by a knuckle-joint a right-angular lever-arm Z, that turns upon short shafts in sockets of standards of the resisting girder N as bearings. To the lower end of this lever Z is attached by another joint an arm or lever C'', which is secured at the other end by a pivot or swinging joint to the sliding or pushing block D'. The downward motion of the cross-head resulting from the operation of the driving-wheels and connecting-rods, as described, imparts a motion in a forward direction to the blocks D', which thereby push off the bricks, &c., formed from the surface of the mold-block delivering them from the machine.

In the machine described and represented in the drawings the results accomplished by the action of the machine, such as the filling of the molds and exhausting the air, &c., are represented as taking place at but two points diametrically opposite, whereas it is evident that the machine may be so arranged without changing the essential features of my invention as to allow of more than two or only one mold of the mold-block to be operated upon at one time.

It is evident that the molds may be made of any desired shape or size, and that the depth or thickness of the bricks, tiles, &c., may be varied at pleasure by increasing or diminishing the distance to which the prong or prongs of the block c' project or enter into the mold-brick, also that any desired configuration may be produced upon one or both surfaces of the bricks, tiles, &c., by making the plungers or rams $x$ $x$, bottom rams C' C', and perforated blocks Q' corresponding with the effect to be produced. It is also evident that instead of only two bricks or tiles being formed at each of the hoppers at one time, as represented in the drawings, any desired number may be allowed to be formed by simply increasing the number of molds, plungers, &c., in the same proportion.

Having thus described my improvements, I shall state my claims as follows:

1. In one machine, the combination, with the mechanism for forming bricks by pressing the clay in molds, of an air-pump for exhausting the air and gases from the material in the molds so that the operations shall be simultaneous, as herein set forth.

2. The combination and arrangement of the devices for performing the operations of filling the molds, pressing the materials therein, exhausting the air and gases therefrom, and removing the bricks or other products made from the machine, substantially as described, and for the purpose set forth.

3. The combination, with and arrangement in relation to a traveling mold block or plate having any required number of molds formed therein of any desired size or shape, of the filling, pressing, air-exhausting, and pushing-off devices so as to operate as herein described, whereby such intermittent motion is imparted to the said mold-block as to bring it in opposition with the said filling, pressing, air-exhausting, and pushing-off devices at the proper times, as set forth.

4. The perforated plate Q', in combination with the air-pump used for exhausting air or gases from the material in the molds, as described.

5. So arranging the plunger-bearings as to cause the plungers to operate with a permanently-elastic yielding pressure while filling the molds, substantially as described.

6. The arrangement of devices for removing the bricks or other articles when formed from the machine, the same consisting of the lever $z$ and the pushing-blocks D, operated substantially as described.

7. The combination of devices whereby an intermittent rotary motion is given to the mold block or plate in such a manner as to carry the molds or dies to the proper localities for the material with which they are to be filled to be operated upon and remain stationary during such operations, the same consisting, substantially, of the eccentric-wheel F', wheel-frame G, and ratchet-wheel K, operating together, as described.

JOHN MELLING.

Witnesses:
F. HOOPER,
THOS. J. MAYALL.